(12) United States Patent
Nakabayashi et al.

(10) Patent No.: US 12,117,620 B2
(45) Date of Patent: Oct. 15, 2024

(54) VEHICLE DISPLAY SYSTEM AND VEHICLE

(71) Applicant: KOITO MANUFACTURING CO., LTD., Tokyo (JP)

(72) Inventors: Masaaki Nakabayashi, Shizuoka (JP); Yoshinori Shibata, Shizuoka (JP); Misako Kamiya, Shizuoka (JP); Naoki Takii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/765,229

(22) PCT Filed: Sep. 23, 2020

(86) PCT No.: PCT/JP2020/035783
§ 371 (c)(1),
(2) Date: Mar. 30, 2022

(87) PCT Pub. No.: WO2021/065617
PCT Pub. Date: Apr. 8, 2021

(65) Prior Publication Data
US 2022/0350155 A1 Nov. 3, 2022

(30) Foreign Application Priority Data
Sep. 30, 2019 (JP) ................. 2019-179483

(51) Int. Cl.
*G02B 27/01* (2006.01)
*B60K 35/00* (2024.01)
(Continued)

(52) U.S. Cl.
CPC .......... *G02B 27/0179* (2013.01); *B60K 35/00* (2013.01); *G09G 3/002* (2013.01);
(Continued)

(58) Field of Classification Search
CPC ........ G02B 27/0179; G02B 2027/0185; G02B 27/0101; B60K 35/00; B60K 2370/1529;
(Continued)

(56) References Cited

U.S. PATENT DOCUMENTS

| | | |
|---|---|---|
| 2009/0160736 A1 | 6/2009 | Shikita |
| 2017/0140651 A1 | 5/2017 | Lee et al. |

(Continued)

FOREIGN PATENT DOCUMENTS

| | | |
|---|---|---|
| CN | 101464562 A | 6/2009 |
| CN | 106696701 A | 5/2017 |

(Continued)

OTHER PUBLICATIONS

International Search Report issued in International Application No. PCT/JP2020/035783, mailed Dec. 8, 2020 (5 pages).
(Continued)

*Primary Examiner* — Douglas M Wilson
(74) *Attorney, Agent, or Firm* — Osha Bergman Watanabe & Burton LLP (57) ABSTRACT

A vehicle display system is provided in a vehicle and includes: a first display device configured to project a light pattern onto a road surface outside the vehicle; a second display device inside the vehicle configured to display a predetermined image to an occupant of the vehicle such that the predetermined image is superimposed on a real space outside the vehicle; and a controller configured to control the first display device and the second display device. In a case where both the predetermined image and the light pattern are displayed, the controller causes a distance from the occupant to the predetermined image to match a distance from the occupant to the light pattern.

9 Claims, 9 Drawing Sheets

(51) Int. Cl.
 *B60K 35/23* (2024.01)
 *B60K 35/81* (2024.01)
 *G09G 3/00* (2006.01)
 *B60Q 1/08* (2006.01)

(52) U.S. Cl.
 CPC .............. *B60K 35/23* (2024.01); *B60K 35/81* (2024.01); *B60K 2360/177* (2024.01); *B60K 2360/334* (2024.01); *B60Q 1/085* (2013.01); *B60Q 2300/45* (2013.01); *B60Q 2400/50* (2013.01); *G02B 27/0101* (2013.01); *G02B 2027/0185* (2013.01); *G09G 2340/0464* (2013.01); *G09G 2380/10* (2013.01)

(58) Field of Classification Search
 CPC .......... B60K 2370/52; B60K 2370/177; B60K 2370/334; B60K 2370/797; B60K 35/23; B60K 35/81; B60K 2360/177; B60K 2360/334; G09G 3/002; G09G 2340/0464; G09G 2380/10; B60Q 1/085; B60Q 2300/45; B60Q 2400/50; B60Q 2400/0185
 See application file for complete search history.

(56) References Cited

U.S. PATENT DOCUMENTS

| | | |
|---|---|---|
| 2017/0337821 A1 | 11/2017 | Masuda et al. |
| 2018/0009374 A1* | 1/2018 | Kim ...................... B60Q 1/085 |
| 2018/0033306 A1* | 2/2018 | Kim ...................... G06V 40/103 |
| 2018/0253609 A1* | 9/2018 | Potter ...................... B60Q 1/08 |
| 2019/0051185 A1 | 2/2019 | Masuda et al. |
| 2019/0139286 A1* | 5/2019 | Shimoda .............. G08G 1/0962 |
| 2020/0079279 A1* | 3/2020 | Gut ...................... B60Q 1/1415 |
| 2020/0286292 A1* | 9/2020 | Kondo .................. B60K 35/10 |
| 2020/0353817 A1 | 11/2020 | Nakada et al. |

FOREIGN PATENT DOCUMENTS

| | | |
|---|---|---|
| JP | 2013-032087 A | 2/2013 |
| JP | 2016-055691 A | 4/2016 |
| JP | 2018-149856 A | 9/2018 |
| JP | 2019-094021 A | 6/2019 |

OTHER PUBLICATIONS

Written Opinion issued in International Application No. PCT/JP2020/035783, mailed Dec. 8, 2020 (3 pages).
First Office Action in corresponding Chinese Application No. 202080061107.0, dated Jun. 21, 2024 (16 pages).

* cited by examiner

VEHICLE DISPLAY SYSTEM AND VEHICLE

TECHNICAL FIELD

The present disclosure relates to a vehicle display system and a vehicle including the vehicle display system.

BACKGROUND

JP2016-55691A discloses a vehicle display system configured to inform or warn a driver (occupant) or another person (target object), such as a pedestrian and an oncoming vehicle, about vehicle information by a road-surface projector projecting a light pattern onto a road surface. The vehicle display system informs or warns the driver about the vehicle information also by a head-up display (HUD) device projecting a predetermined image onto a windshield or the like of the vehicle. The driver recognizes the predetermined image projected onto the windshield or the like of the vehicle as a virtual image formed in a predetermined position in front of the windshield or the like.

SUMMARY

Technical Problem

If a distance from the occupant to the virtual image is different from a distance from the occupant to the light pattern on the road surface, it may be difficult for the occupant focusing on one of the virtual image and the light pattern to grasp information indicated by the other. That is, in such a situation, visibility of one of the virtual image and the light pattern from the occupant may be reduced.

An object of the present disclosure is to provide a vehicle display system that can improve visibility of a light pattern projected onto a road surface and a predetermined image displayed to an occupant and to provide a vehicle including the vehicle display system.

Solution to Problem

A vehicle display system according to an aspect of the present disclosure is provided in a vehicle and includes:

a first display device configured to project a light pattern onto a road surface outside the vehicle;

a second display device inside the vehicle configured to display a predetermined image to an occupant of the vehicle such that the predetermined image is superimposed on a real space outside the vehicle; and a controller configured to control the first display device and the second display device, in which, in a case where both the predetermined image and the light pattern are displayed, the controller causes a distance from the occupant to the predetermined image to match a distance from the occupant to the light pattern.

According to the above-described configuration, since the distance from the occupant to the predetermined image matches that from the occupant to the light pattern, the occupant can grasp the information indicated by the predetermined image and the information indicated by the light pattern together. That is, visibility of the light pattern and the predetermined image from the occupant can be improved.

"A distance matches" refers to a case where a range of the distance at which the predetermined image is displayed overlaps with a range of the distance at which the light pattern is displayed at least in part in the front-rear direction of the vehicle. "The range of the distance at which the predetermined picture is displayed" refers to a display position of the predetermined image displayed two-dimensionally or a display distance range of the predetermined image displayed three-dimensionally. Essentially, as long as the occupant can see the predetermined image and the light pattern without changing a focal distance, a display distance range of the predetermined image may not even overlap with a display distance range of the light pattern in the front-rear direction of the vehicle. For example, if the predetermined image and the light pattern are displayed nearly at a predetermined distance from the occupant in the front-rear direction of the vehicle and the display distance range of the predetermined image does not overlap with that of the light pattern but they are deviated by about 10% from the predetermined distance, the case meets "a distance matches."

"Both are displayed" refers to a case where both the predetermined image and the light pattern are displayed at a certain time point. Therefore, a case where display timings are different but a display period of the predetermined image overlaps with a display period of the light pattern in part meets the condition.

A vehicle including the vehicle display system is also provided.

According to the above-described configuration, the vehicle that can improve the visibility of the light pattern projected onto the road surface and the predetermined image displayed to the occupant from the occupant is provided.

Advantageous Effects of Invention

According to the present disclosure, it is possible to provide a vehicle display system that can improve visibility of a light pattern projected onto a road surface and a predetermined image displayed to the occupant from the occupant and to provide a vehicle including the vehicle display system.

DESCRIPTION OF EMBODIMENTS

In the following, an embodiment of the present disclosure (hereinafter, referred to as a present embodiment) will be described with reference to the drawings. Dimensions of components shown in the drawings may be different from actual dimensions for the sake of convenience.

In the present embodiment, for the sake of convenience, a "left-right direction," an "upper-lower direction," and a "front-rear direction" may be referred to as appropriate. These directions are relative directions set for a vehicle 1 shown in FIG. 1. the "left-right direction" includes a "left direction" and a "right direction." The "upper-lower direction" includes an "upper direction" and a "lower direction." The "front-rear direction" includes a "front direction" and a "rear direction."

Figure 1:
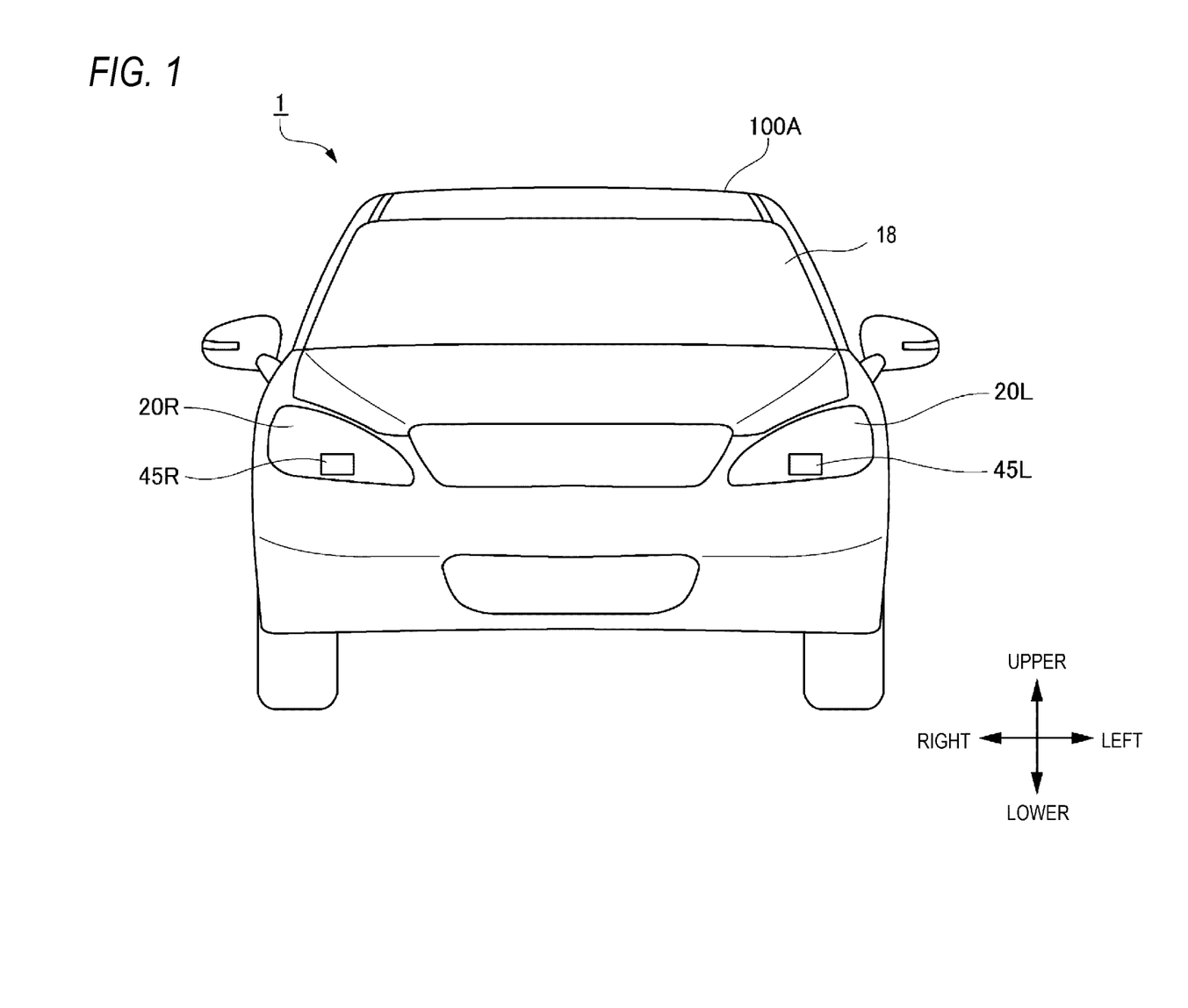
FIG. 1 is a front view of a vehicle on which a vehicle system is mounted.
Figure 2:
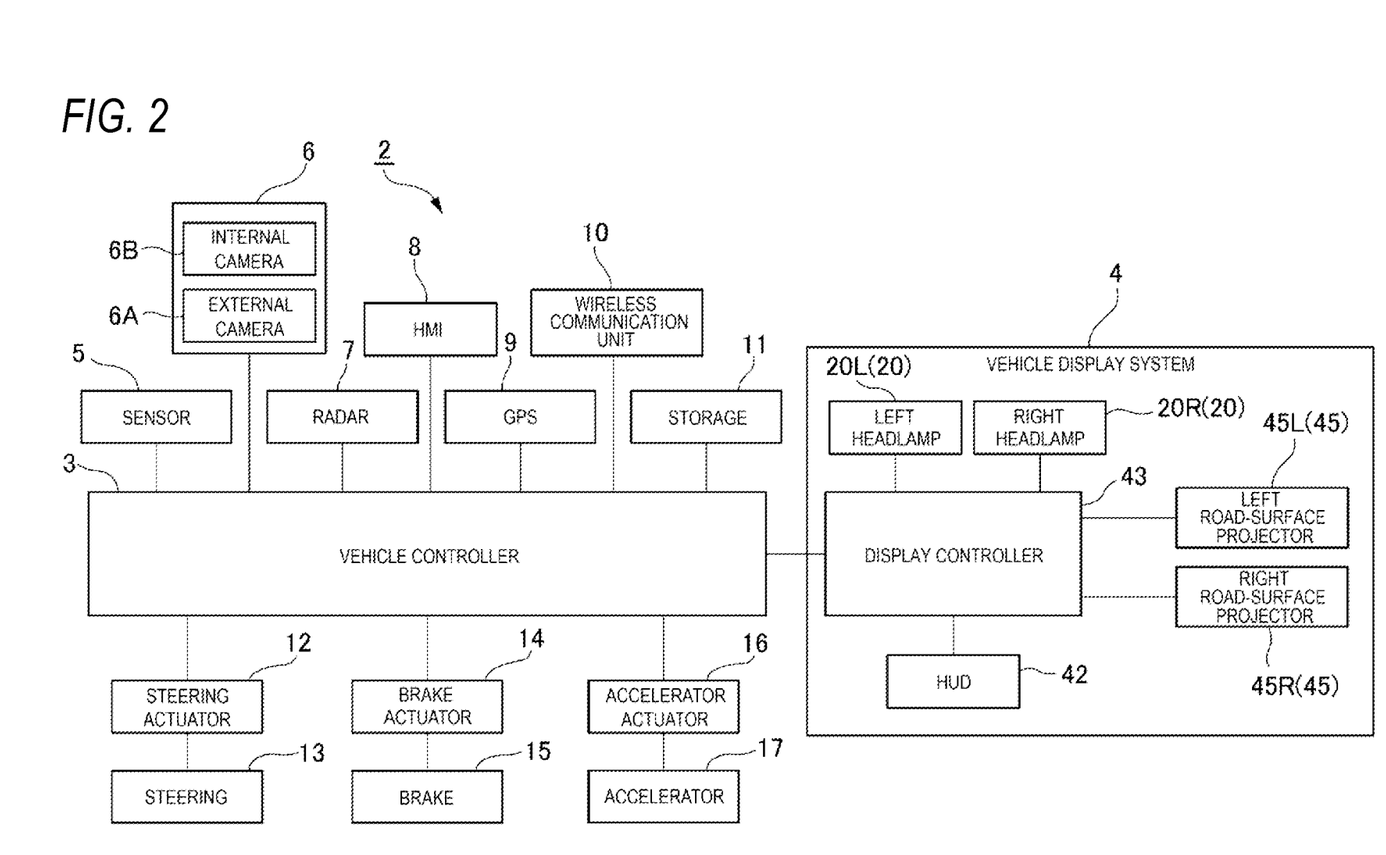
FIG. 2 is a block diagram of the vehicle system.

First, a vehicle system 2 according to the present embodiment will be described in the following with reference to FIGS. 1 and 2. FIG. 1 is a front view of the vehicle 1 on which the vehicle system 2 is mounted. FIG. 2 is a block diagram of the vehicle system 2. The vehicle 1 is a vehicle (automobile) configured to travel in self-driving mode.

As shown in FIG. 2, the vehicle system 2 includes: a vehicle controller 3; a vehicle display system 4 (hereinafter, simply referred to as a "display system 4"); a sensor 5; a camera 6; and a radar 7. The vehicle system 2 further includes: a human-machine interface (HMI) 8; a global positioning system (GPS) 9; a wireless communication unit 10; a storage 11; a steering actuator 12; a steering 13; a brake actuator 14; a brake 15; an accelerator actuator 16; and an accelerator 17.

The vehicle controller 3 is configured to control traveling of the vehicle 1. The vehicle controller 3 is configured with, for example, at least one electronic control unit (ECU). The electronic control unit includes: a computer system, for example, a system on a chip (SoC) including one or more processors and one or more memories; and electronic circuitry configured with an active element, such as a transistor, and a passive element. The processor includes, for example, at least one of a central processing unit (CPU), a micro processing unit (MPU), a graphics processing unit (GPU) and a tensor processing unit (TPU). The CPU may be configured with a plurality of CPU cores. The GPU may be configured with a plurality of GPU cores. The memory includes a read-only memory (ROM) and a random-access memory (RAM). The ROM may store a vehicle control program. The vehicle control program may include, for example, an artificial intelligence (AI) program for autonomous driving. The AI program is a program (a trained model) constructed by supervised or unsupervised machine learning (particularly, deep learning) using a multilayer neural network. The RAM may temporarily store the vehicle control program, vehicle control data, and/or surrounding information representing surroundings of the vehicle. The processor may be configured to load a program designated by various vehicle control programs stored in the ROM onto the RAM to execute a variety of processing in cooperation with the RAM. The computer system may be configured with a non-von Neumann computer, such as an application-specific integrated circuit (ASIC) or a field-programmable gate array (FPGA). The computer system may be configured with a combination of a von Neumann computer and a non-von Neumann computer.

The display system 4 includes: a left headlamp 20L; a right headlamp 20R; a left road-surface projector 45L; and a right road-surface projector 45R. The display system 4 further includes a head-up display (HUD) 42 and a display controller 43.

As shown in FIG. 1, the left headlamp 20L is on a left-front side of the vehicle 1 and includes a low-beam lamp configured to emit low beam light to a front side of the vehicle 1 and a high-beam lamp configured to emit high beam light to the front side of the vehicle 1. The right headlamp 20R is on a right-front side of the vehicle 1 and includes a low-beam lamp configured to emit low beam light to the front side of the vehicle 1 and a high-beam lamp configured to emit a high beam light to the front side of the vehicle 1. Each of the low-beam lamp and the high-beam lamp includes: one or more light-emitting elements, such as light-emitting diodes (LED) and laser diodes (LD); and an optical member, such as a lens and a reflector. Hereinafter, for the sake of convenience, the left headlamp 20L and the right headlamp 20R may be generically referred to as the headlamp 20 simply.

The left road-surface projector 45L (an example of a first display device) is in a lamp chamber of the left headlamp 20L. The left road-surface projector 45L is configured to emit a light pattern toward a road surface outside the vehicle 1. The left road-surface projector 45L includes: a light source; a driven mirror; an optical system, such as a lens and a mirror; a light-source drive circuit; and a mirror drive circuit, for example. The light source is configured with a laser light source or an LED light source. The laser light source is, for example, an RGB laser light source configured to emit red laser light, green laser light, and blue laser light. The driven mirror is configured with, for example, a micro-electromechanical systems (MEMS) mirror, a digital mirror device (DMD), a Galvano mirror, or a polygon mirror. The light source drive circuit is configured to drive and control the light source. The light-source drive circuit is configured to generate a control signal for controlling the light source based on a signal related to a predetermined light pattern transmitted from the display controller 43 and to transmit the generated control signal to the light source. The mirror drive circuit is configured to drive and control the driven mirror. The mirror drive circuit is configured to generate a control signal for controlling the driven mirror based on a signal related to a predetermined light pattern transmitted from the display controller 43 and to transmit the generated control signal to the driven mirror. If the light source is the RGB laser light source, the left road-surface projector 45L can project light patterns in various colors onto the road surface by scanning by the laser light.

The right road-surface projector 45R (an example of the first display device) is in a lamp chamber of the right headlamp 20R. The right road-surface projector 45R is configured to emit a light pattern toward the road surface outside the vehicle 1. Similarly to the left road-surface projector 45L, the right road-surface projector 45R includes: a light source; a driven mirror; an optical system, such as a lens; a light-source drive circuit; and a mirror drive circuit.

Projection by the left road-surface projector 45L and the right road-surface projector 45R may be by a raster scanning, digital light processing (DLP), or liquid crystal on silicon (LCOS). If DLP or LCOS is adopted, the light source may be an LED light source. The projection by the left road-surface projector 45L and the right road-surface projector 45R may be by liquid-crystal display (LCD) projection. If LCD projection method is adopted, the light source may be a plurality of LED light sources arranged in a matrix shape. In the present embodiment, the left road-surface projector 45L and the right road-surface projector 45R may be on a vehicle roof 100A. In this case, one road-surface projector may be on the vehicle roof 100A. Hereinafter, for the sake of convenience, the left road-surface projector 45L and the right road-surface projector 45R may be generically referred to as the road surface projector 45 simply. In the following, the road-surface projector 45 refers to: the left road-surface projector 45L; the right road-surface projector 45R; or a combination of the left road-surface projector 45L and the right road-surface projector 45R.

The HUD 42 (an example of a second display device) is inside the vehicle 1. Specifically, the HUD 42 is in a predetermined position in the interior of the vehicle 1. For example, the HUD 42 may be in a dashboard of the vehicle 1. The HUD 42 is configured to function as a visual interface between the vehicle 1 and an occupant. The HUD 42 is configured to display HUD information to the occupant such that predetermined information (hereinafter, referred to as HUD information) is superimposed on a real space outside the vehicle 1 (particularly, surroundings in front of the vehicle 1). In this way, the HUD 42 is configured to function as an augmented reality (AR) display. The HUD information displayed by the HUD 42 is, for example, vehicle traveling information related to traveling of the vehicle 1 and/or surrounding information related to surroundings of the vehicle 1 (particularly, information related to a target object outside the vehicle 1).

Figure 3:
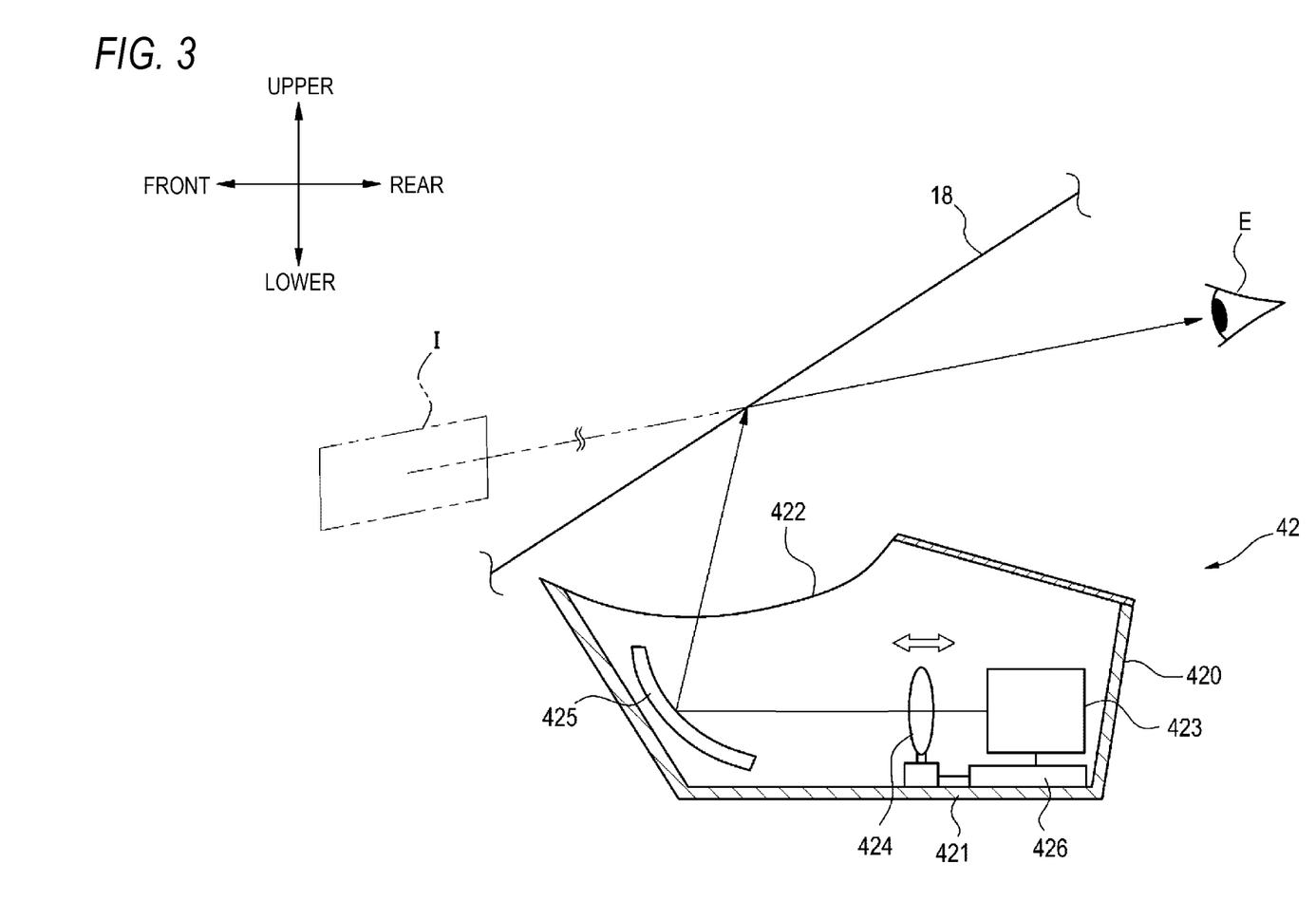
FIG. 3 is a schematic diagram of a head-up display included in the vehicle system.

As shown in FIG. 3, the HUD 42 includes a HUD body portion 420. The HUD body portion 420 includes a housing 421 and an emission window 422. The emission window 422 is configured with a transparent plate configured to transmit light. Inside the housing 421, the HUD body portion 420 includes: a picture generation unit (PGU) 423; a lens 424; a concave mirror 425; and a control substrate 426.

The picture generation unit 423 is configured to emit light for generating a predetermined image to be displayed to the occupant of the vehicle 1. Although not shown in detail, the picture generation unit 423 includes: a light source; an optical component; and a display. The light source is, for example, a laser light source or an LED light source. The laser light source is, for example, an RGB laser light source configured to emit red laser light, green laser light, and blue laser light. The optical component includes: a prism; a lens; a diffusion plate; a magnifying glass; and the like as appropriate. The optical component is configured to transmit light emitted from the light source toward the display. The display is a liquid-crystal display, a digital mirror device (DMD), or the like. Projection by the picture generation unit 423 may be by raster scanning, DLP, or LCOS. If DLP or LCOS is adopted, a light source of the HUD 42 may be an LED light source. If LCD projection is adopted, the light source of the HUD 42 may be a white LED light source.

The lens 424 is between the picture generation unit 423 and the concave mirror 425. The lens 424 is configured to change a focal distance of light emitted from the picture generation unit 423. The lens 424 is in a position where light emitted from the picture generation unit 423 toward the concave mirror 425 passes through. The lens 424 may include, for example, a drive unit and may be configured to change a distance to the picture generation unit 423 based on a control signal generated by the control substrate 426. Movement of the lens 424 changes the focal distance (apparent optical path length) of the light emitted from the picture generation unit 423 and changes a distance between a windshield 18 and the predetermined image displayed by the HUD 42. For example, a mirror may be used as an optical element instead of the lens.

The concave mirror 425 is on an optical path of the light emitted from the picture generation unit 423. The concave mirror 425 is configured to reflect the light emitted from the picture generation unit 423 toward the windshield 18 (for example, a windshield of the vehicle 1). The concave mirror 425 includes a reflective surface curved in a concave shape to form the predetermined image and is configured to reflect a formed image of the light emitted from the picture generation unit 423 with a predetermined magnifying power. The concave mirror 425 includes a drive mechanism (not shown) and is configured to change a direction of the concave mirror 425 based on a control signal transmitted from the control substrate 426.

The control substrate 426 is configured to control the picture generation unit 423. The control substrate 426 includes: a processor, such as a central processing unit (CPU); and a memory. The processor is configured to execute a computer program loaded from the memory to control the picture generation unit 423. For example, the control substrate 426 is configured to generate a control signal for controlling the picture generation unit 423 based on the vehicle traveling information, the surrounding information, and the like that are transmitted from the vehicle control unit 3 via the display controller 43 and to transmit the generated control signal to the picture generation unit 423. The control substrate 426 may perform control to change the direction of the concave mirror 425.

Although the control substrate 426 and the display controller 43 are separated in the present embodiment, the control substrate 426 may be a part of the display controller 43.

The light emitted from the picture generation unit 423 is reflected by the concave mirror 425 and is emitted from the emission window 422 of the HUD body portion 420. The light emitted from the emission window 422 of the HUD body portion 420 reaches the windshield 18. Some of the light reaching the windshield 18 is reflected toward a visual point E of the occupant. As a result, the occupant recognizes the light emitted from the HUD body portion 420 as a virtual image (an example of the predetermined image) formed at a predetermined distance in front of the windshield 18. Since the image displayed by the HUD 42 is superimposed on the real space in front of the vehicle 1 through the windshield 18 in this way, the occupant can visually recognize that a virtual image object I formed by the virtual image floats above the road outside the vehicle.

A distance of the virtual image object I (a distance from the visual point E of the occupant to the virtual image) can be adjusted by adjusting the position of the lens 424 as appropriate. When a two-dimensional image (planar image) is formed as the virtual image object I, the predetermined image is projected at a single distance arbitrarily determined. When a three-dimensional image (solid image) is formed as the virtual image object I, a plurality of predetermined images that are identical to or different from each other are projected at a plurality of distances that are different from each other.

The display controller 43 (an example of a controller) is configured to control the road-surface projector 45 (specifically, the left road-surface projector 45L and the right road-surface projector 45R), the headlamp 20 (specifically, the left headlamp 20L and the right headlamp 20R), and the HUD 42. The display controller 43 is configured to control the road-surface projector 45 (specifically, the left road-surface projector 45L and the right road-surface projector 45R) such that the light pattern is emitted to a predetermined position on the road surface. The display controller 43 is configured to control the HUD 42 such that the HUD information is displayed in a predetermined display region of the windshield 18.

The display controller 43 is configured with an electronic control unit (ECU). The electronic control unit includes: a computer system (for example, a SoC) including one or more processors and one or more memories; and an electronic circuit configured with an active element, such as a transistor, and a passive element. The processor includes at least one of a CPU, an MPU, a GPU, and a TPU. The memory includes a ROM and a RAM. The computer system may be configured with a non-von Neumann computer, such as an ASIC or an FPGA.

The vehicle controller 3 and the display controller 43 are separate in the present embodiment, the vehicle controller 3 and the display controller 43 may be integrated. In this case, the display controller 43 and the vehicle controller 3 may be configured with a single electronic control unit. The display controller 43 may be configured with two electronic control units including: an electronic control unit configured to control the headlamp 20 and the road-surface projector 45; and an electronic control unit configured to control the HUD 42.

The sensor 5 includes at least one of an accelerometer, a speed sensor, and a gyroscope. The sensor 5 is configured to detect a traveling state of the vehicle 1 to output traveling state information to the vehicle controller 3. The sensor 5 may further include: a seating sensor configured to detect whether or not a driver sits in a driver seat; a face orientation sensor configured to acquire an orientation of a face of the driver; an external weather sensor configured to acquire external weather conditions; a human sensor configured to detect whether or not a person is in the vehicle; and the like.

The camera 6 includes an image sensor, such as a charge-coupled device (CCD) and a complementary MOS (CMOS). The camera 6 includes: one or more external cameras 6A; and an internal camera 6B. The external camera 6A is configured to acquire picture data representing surroundings of the vehicle 1 to transmit the picture data to the vehicle controller 3. The vehicle controller 3 is configured to acquire the surrounding information based on the transmitted picture data. The surrounding information may include information on a target object (a pedestrian, another vehicle, a sign, or the like) outside the vehicle 1. For example, the surrounding information may include: information about an attribute of the target object outside the vehicle 1; and information about a distance or a position of the target object with respect to the vehicle 1. The external camera 6A may be configured with a monocular camera or a stereo camera.

The internal camera 6B is inside the vehicle 1 and is configured to acquire picture data representing the occupant. The internal camera 6B functions as a tracking camera configured to track the visual point E of the occupant. The visual point E of the occupant may be a visual point of a left eye or a right eye of the occupant. Alternatively, the visual point E may be the midpoint of a line segment joining the visual point of the left eye and that of the right eye. The display controller 43 may determine a position of the visual point E of the occupant based on the picture data acquired by the internal camera 6B. Based on the picture data, the position of the visual point E of the occupant may be updated at a predetermined cycle or determined only once during activation of the vehicle 1.

The radar 7 includes at least one of a millimeter-wave radar, a microwave radar, and a laser radar (for example, a LiDAR unit). For example, the LiDAR unit is configured to grasp the surroundings of the vehicle 1. Particularly, the LiDAR unit is configured to acquire three-dimensional mapping data (point group data) representing the surroundings of the vehicle 1 to transmit the three-dimensional mapping data to the vehicle controller 3. The vehicle controller 3 is configured to determine the surrounding information based on the transmitted three-dimensional mapping data.

The HMI 8 is configured with: an input unit configured to receive an input operation from the driver; and an output unit configured to output the traveling information and the like to the driver. The input unit includes: a steering wheel; an accelerator pedal; a brake pedal; a driving-mode switch configured to switch driving modes of the vehicle 1; and the like. The output unit is a display (excluding the HUD) configured to display a variety of traveling information. The GPS 9 is configured to acquire current position information of the vehicle 1 to output the acquired current position information to the vehicle controller 3.

The wireless communication unit 10 is configured to receive information about another vehicle around the vehicle 1 (for example, traveling information or the like) from another vehicle and to transmit information about the vehicle 1 (for example, traveling information or the like) to another vehicle (vehicle-to-vehicle communication). The wireless communication unit 10 is configured to receive infrastructure information from an infrastructure facility, such as a traffic light and a traffic sign, and to transmit the traveling information of the vehicle 1 to an infrastructure facility (vehicle-to-infrastructure communication). The wireless communication unit 10 is configured to receive information about a pedestrian from a portable electronic device (a smart phone, a tablet computer, a wearable device, or the like) carried by the pedestrian and to transmit the vehicle traveling information of the vehicle 1 to the portable electronic device (vehicle-to-pedestrian communication). The vehicle 1 may communicate with another vehicle, the infrastructure facility, or the portable electronic device directly in an ad-hoc mode or via an access point. The vehicle 1 may communicate with another vehicle, the infrastructure facility, or the portable electronic device via a communication network (not shown). The communication network includes at least one of the Internet, a local area network (LAN), a wide area network (WAN), and a radio access network (RAN). A radio communication standard is, for example, Wi-Fi (registered trademark), Bluetooth (registered trademark), ZigBee (registered trademark), LPWA, DSRC (registered trademark), or Li-Fi. The vehicle 1 may communicate with another vehicle, the infrastructure facility, or the portable electronic device using a fifth generation mobile communication system (5G).

The storage 11 is an auxiliary storage, such as a hard disk drive (HDD) and a solid-state drive (SSD). The storage 11 may store two-dimensional or three-dimensional map information and/or a vehicle control program. For example, the three-dimensional map information may be configured with the three-dimensional mapping data (point group data). The storage 11 is configured to output the map information and the vehicle control program to the vehicle controller 3 in response to a request from the vehicle controller 3. The map information and the vehicle control program may be updated using the wireless communication unit 10 via the communication network.

When the vehicle 1 travels in self-driving mode, the vehicle controller 3 automatically generates at least one of a steering control signal, an accelerator control signal, and a brake control signal based on the traveling state information, the surrounding information, the current position information, the map information, and the like. The steering actuator 12 is configured to receive the steering control signal from the vehicle controller 3 to control the steering 13 based on the received steering control signal. The brake actuator 14 is configured to receive the brake control signal from the vehicle controller 3 to control the brake 15 based on the received brake control signal. The accelerator actuator 16 is configured to receive the accelerator control signal from the vehicle controller 3 to control the accelerator 17 based on the received accelerator control signal. In this way, the vehicle controller 3 is configured to control traveling of the vehicle 1 automatically based on the traveling state information, the surrounding information, the current position information, the map information, and the like. That is, in self-driving mode, the traveling of the vehicle 1 is automatically controlled by the vehicle system 2.

In contrast, when the vehicle 1 travels in a manual driving mode, the vehicle controller 3 generates the steering control signal, the accelerator control signal, and the brake control signal based on the driver's manual operation onto the steering wheel, the accelerator pedal, and the brake pedal. Since the steering control signal, the accelerator control signal, and the brake control signal are generated based on the driver's manual operation in this way in the manual driving mode, the traveling of the vehicle 1 is controlled by the driver.

Next, driving modes of the vehicle 1 will be described. The driving modes includes the self-driving mode and the manual driving mode. The self-driving mode includes: a full automation mode; an advanced driver assistance mode; and a driving assistance mode. In the full automation mode, the vehicle system 2 automatically controls all of a steering control, a brake control, and an accelerator control, and the driver cannot drive the vehicle 1. In the advanced driver assistance mode, the vehicle system 2 automatically controls all of the steering control, the brake control, and the accelerator control, and the driver can but does not drive the vehicle 1. In the driver assistance mode, the vehicle system 2 automatically controls some of the steering control, the brake control, and the accelerator control, and the driver drives the vehicle 1 with the driving assistance of the vehicle system 2. In contrast, in the manual driving mode, the vehicle system 2 does not automatically perform the traveling control, and the driver drives the vehicle 1 without the driving assistance of the vehicle system 2.

The driving modes of the vehicle 1 may be switched by an operation onto the driving-mode switch. In this case, the vehicle controller 3 switches the driving modes of the vehicle 1 among the four driving modes (the full automation mode, the advanced driver assistance mode, the driver assistance mode, and the manual driving mode) based on the driver's operation onto the driving-mode switch. The driving modes of the vehicle 1 may be automatically switched based on: information about a traveling-allowed section in which autonomous driving is allowed and a traveling-prohibited section in which autonomous driving is prohibited; or information about external weather conditions. In this case, the vehicle controller 3 switches the driving modes of the vehicle 1 based on such information. The driving modes of the vehicle 1 may be automatically switched using the seating sensor, the face direction sensor, and the like. In this case, the vehicle controller 3 switches the driving modes of the vehicle 1 based on an output signal from the seating sensor or the face orientation sensor.

First Embodiment

Figure 4:
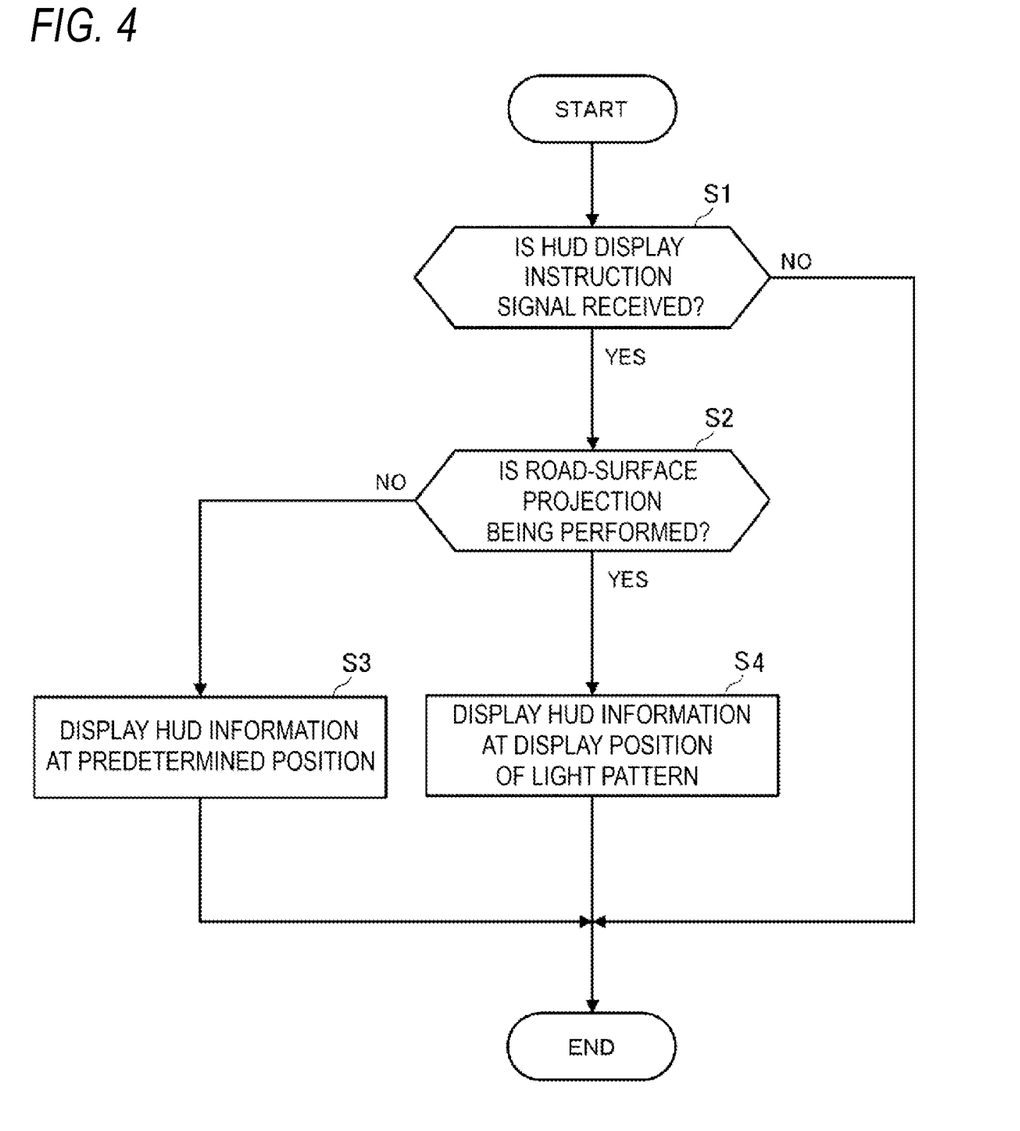
FIG. 4 is a flowchart illustrating an example of operation of a display controller according to a first embodiment.
Figure 5:
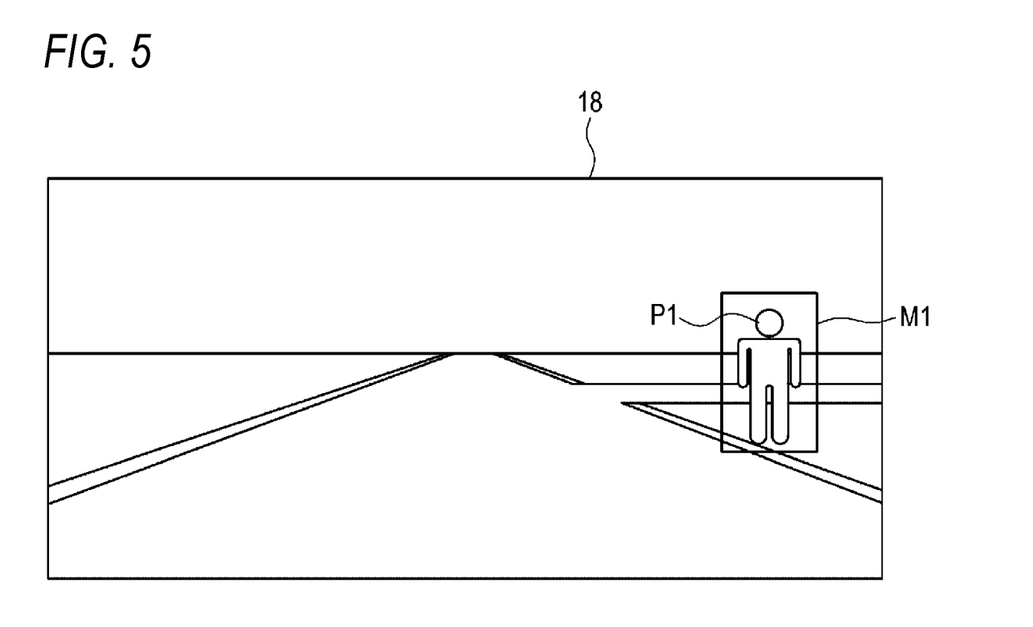
FIG. 5 is a diagram showing HUD information in a field of view of an occupant.
Figure 6:
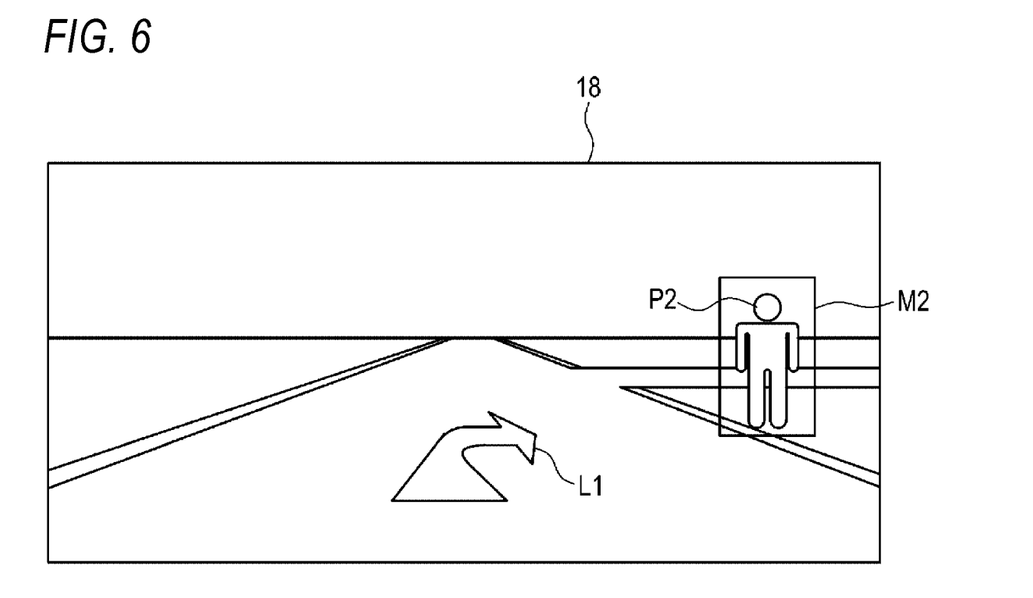
FIG. 6 is a diagram showing HUD information and a light pattern in the field of view of the occupant.
Figure 7:
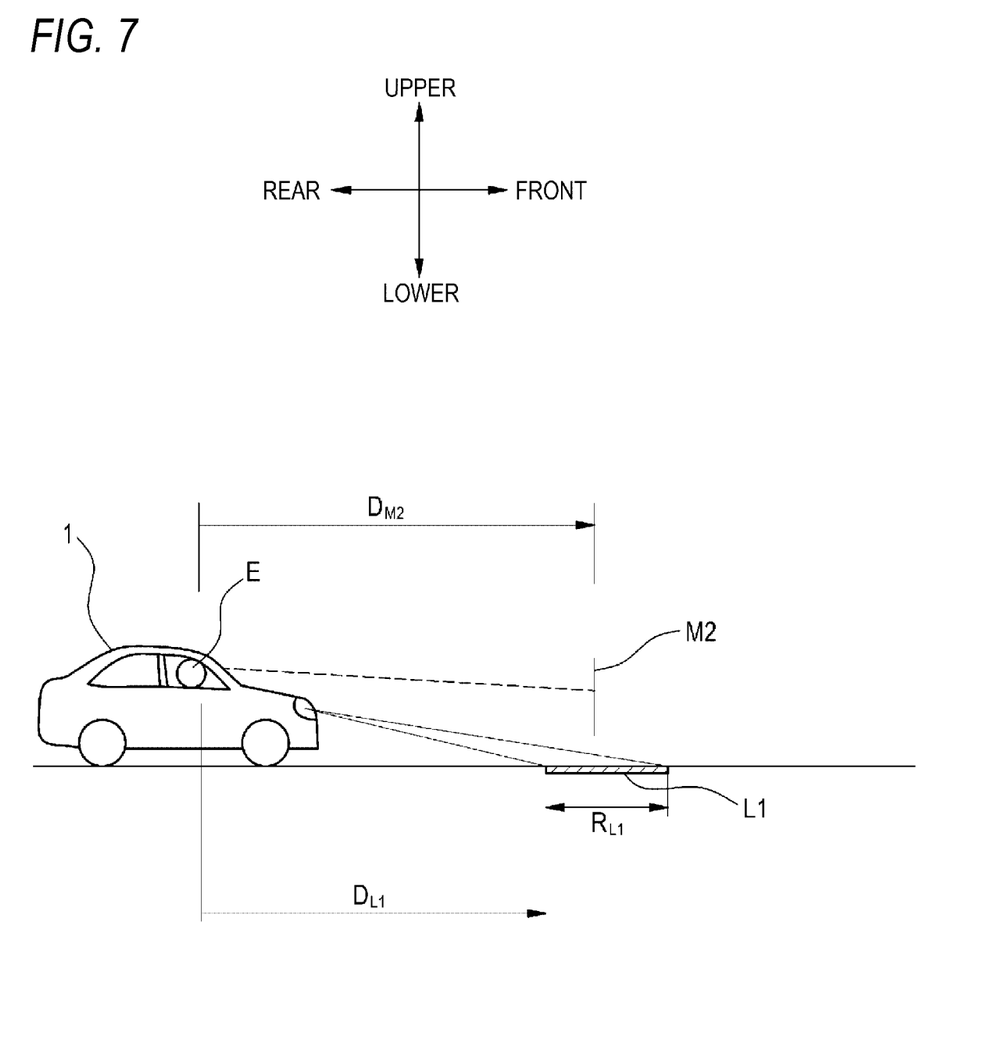
FIG. 7 is a schematic diagram showing distances from a visual point of the occupant of the vehicle to a position in which a frame pattern is formed and a position in which the light pattern is formed.

Next, an example of operation of the display controller 43 according to a first embodiment will be described in the following with reference to FIGS. 4 to 7. FIG. 4 is a flowchart illustrating the example of operation of the display controller 43. FIG. 5 is a diagram showing HUD information (specifically, a frame pattern M1) in a field of view of the occupant. FIG. 6 is a diagram showing HUD information (specifically, a frame pattern M2) and a light pattern L1 in the field of view of the occupant. FIG. 7 is a schematic diagram showing distances from the visual point E of the occupant of the vehicle 1 to a position in which the frame pattern M2 is formed (a display position of a virtual image forming the frame pattern M2) and to a position in which the light pattern L1 is formed (display position). In FIGS. 5 to 7, the frame pattern is shown as an example of a virtual image object of the HUD information.

As shown in FIG. 4, the display controller 43 determines whether a HUD display instruction signal is received from the vehicle controller (step S1). If a pedestrian is detected based on the surrounding information, the vehicle controller 3 transmits, to the display controller 43, the HUD display instruction signal to instruct the HUD 42 to display the HUD information. The HUD display instruction signal includes: position information of the target object (pedestrian); and position information of the visual point E of the occupant.

If the HUD display instruction signal is received (YES in step S1), the display controller 43 determines whether the road-surface projector 45 is performing road-surface projection (step S2). On the other hand, if the HUD display instruction signal is not received (NO in step S1), the processing ends.

If the road-surface projection is not being performed (NO in step S2), the display controller 43 controls the HUD 42 to display the HUD information based on the received HUD display instruction signal (step S3). For example, as illustrated in FIG. 5, the display controller 43 controls the HUD 42 such that the frame pattern M1 is displayed to surround the pedestrian P1 based on the position information of the pedestrian P1 and the position information of the visual point E of the occupant. The frame pattern M1 is formed at a predetermined distance from the visual point E of the occupant in the front-rear direction of the vehicle 1. That is, a virtual image forming the frame pattern M1 is displayed at the predetermined distance from the visual point E of the occupant. The frame pattern M1 is formed at a predetermined position in the front-rear direction of the vehicle 1, for example, determined by an optical path length of the light emitted from the picture generation unit 423 of the HUD 42. The frame pattern M1 may be formed at a position that substantially coincides with a position of the pedestrian P1 in the front-rear direction of the vehicle 1 by moving the optical system (for example, the lens 424) of the HUD 42 to change the optical path length of the light. When the position in which the frame pattern M1 is formed in the front-rear direction of the vehicle 1 substantially coincides with that of the pedestrian P1, a position between the frame pattern M1 and the pedestrian P1 in the field of view of the occupant can be maintained even if the visual point E of the occupant is moved.

On the other hand, if the road-surface projection is being performed (YES in step S2), the display controller 43 controls the HUD 42 to display the HUD information based on the received HUD display instruction signal and position information of the light pattern projected onto the road surface (step S4). For example, as illustrated in FIG. 6, the display controller 43 controls the HUD 42 such that the frame pattern M2 is displayed to surround the pedestrian P2 based on position information of the pedestrian P2 and the position information of the visual point E of the occupant. The display controller 43 controls the HUD 42 such that a distance from the visual point E of the occupant to a position in which the frame pattern M2 is formed matches a distance from the visual point E of the occupant to a position of the light pattern L1 projected onto the road surface. For example, as illustrated in FIG. 7, if the frame pattern M2 is a two-dimensional image, the frame pattern M2 is formed within a distance range ($R_{L1}$) of the light pattern L1 projected onto the road surface in the front-rear direction of the vehicle 1 by moving the optical system (for example, the lens 424) of the HUD to change the optical path length of the light. The frame pattern M2 is formed such that $D_{L1} \leq D_{M2} \leq D_{L1} + R_{L1}$ is satisfied, where a distance from the visual point E of the occupant to a virtual image forming the frame pattern M2 is $D_{M2}$ and a distance from the visual point E of the occupant to a rear end of the light pattern L1 is $D_{L1}$.

According to the first embodiment described above, in a case where both the HUD information and the light pattern are displayed, the display controller 43 causes the distance from the occupant to the virtual image of the HUD information to match that from the occupant to the light pattern. Thus, the occupant can grasp the HUD information and information indicated with the light pattern together. That is, it is possible to improve visibility of the light pattern and the HUD information from the occupant.

The display controller 43 is configured to control the HUD 42 such that the distance from the occupant to the virtual image of the HUD information matches that from the occupant to the light pattern projected onto the road surface. Thus, a position in which the light pattern is projected onto the road surface can be set regardless of a position of the virtual image of the HUD information displayed by the HUD 42. For example, when the light pattern indicates information for the occupant, the light pattern can be formed in a position on the road surface that is easily recognized by the occupant. Even if the occupant is seeing the light pattern and the HUD information is displayed, the occupant can quickly grasp the HUD information displayed later without changing a focal distance.

Second Embodiment

Figure 8:
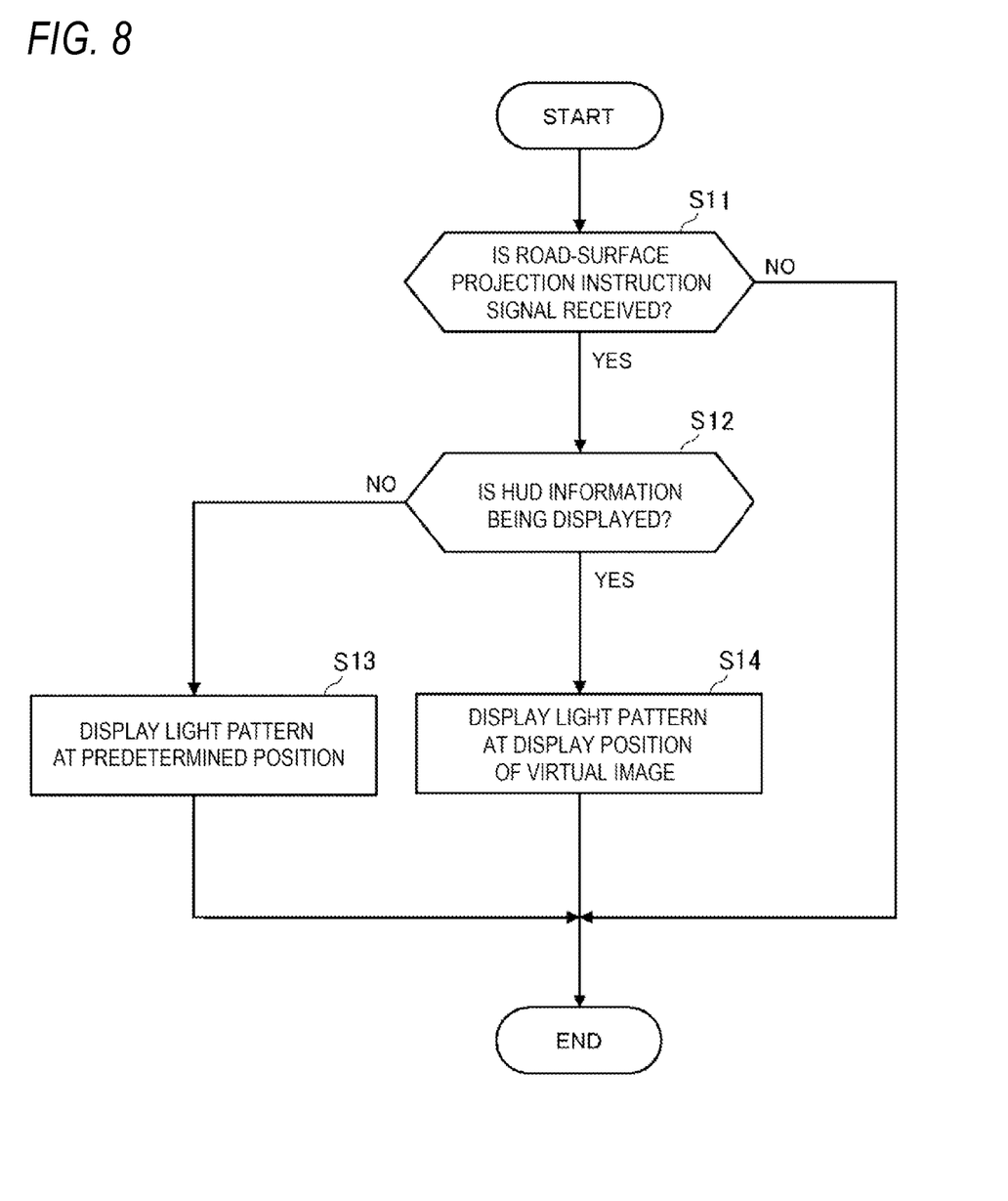
FIG. 8 is a flowchart illustrating an example of operation of a display controller according to a second embodiment.
Figure 9:
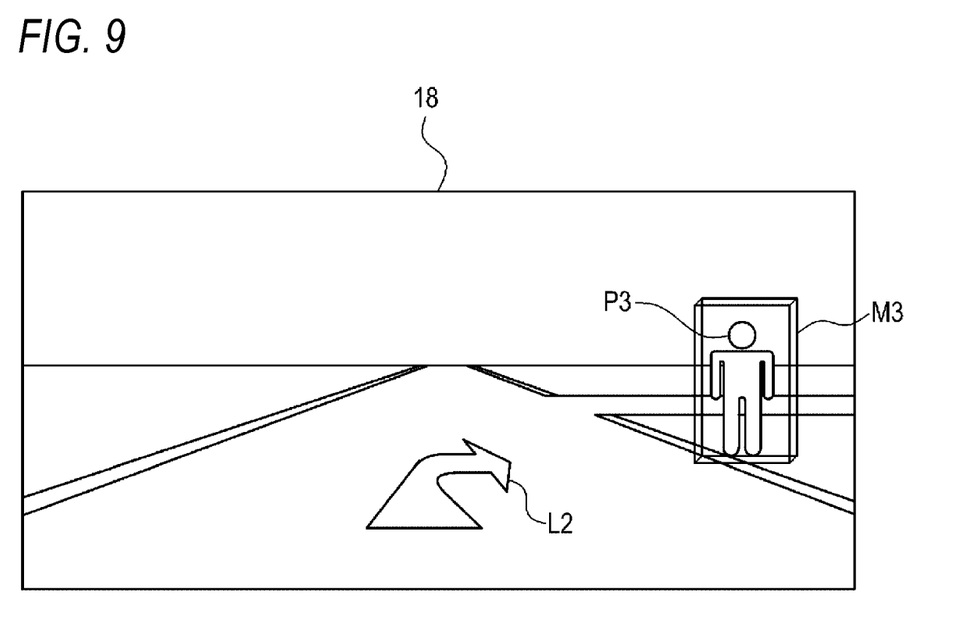
FIG. 9 is a diagram showing HUD information and a light pattern in the field of view of the occupant.
Figure 10:
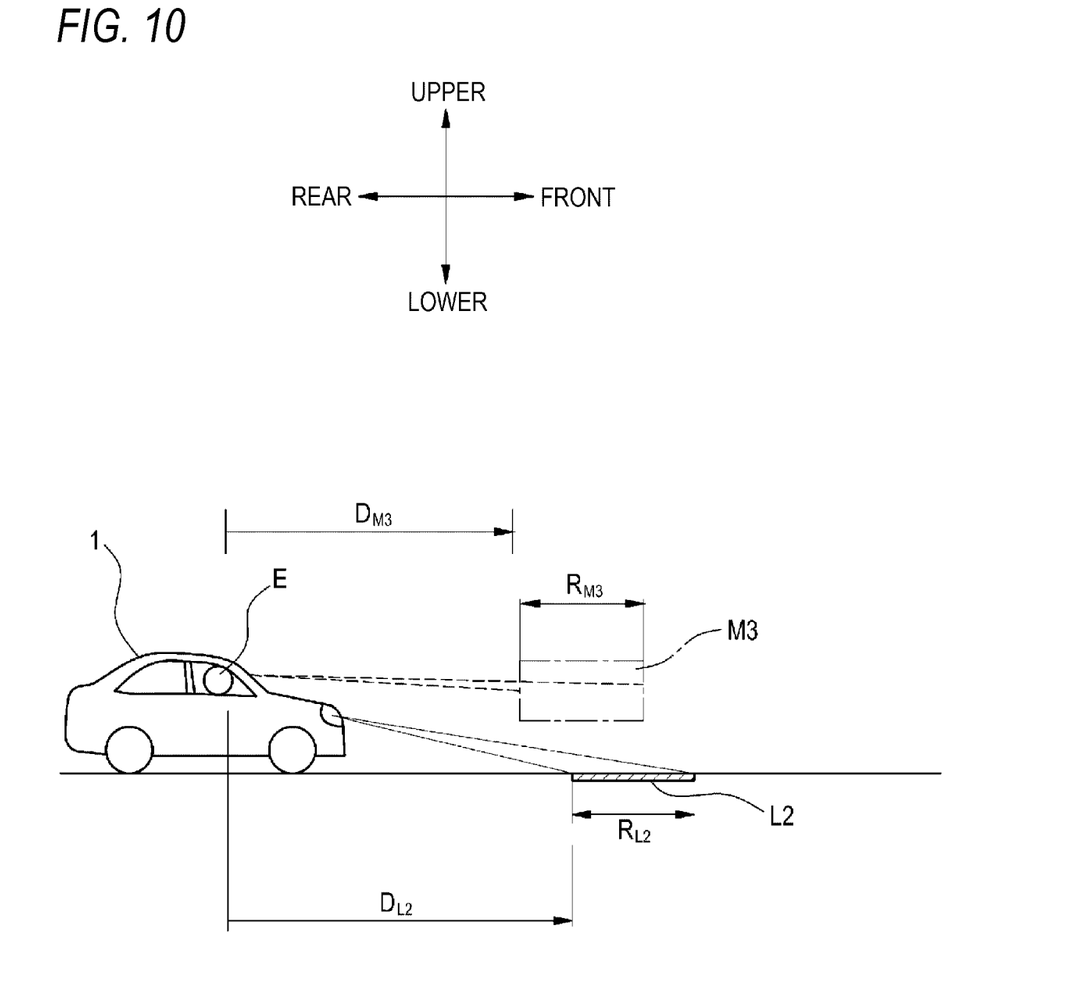
FIG. 10 is a schematic diagram showing distances from the visual point of the occupant of the vehicle to a position in which a frame pattern is formed and a position in which a light pattern is formed.

Next, an example of operation of the display controller 43 according to a second embodiment will be described in the following with reference to FIGS. 8 to 10. FIG. 8 is a flowchart illustrating the example of operation of the display controller 43. FIG. 9 is a diagram showing HUD information (specifically, a frame pattern M3) and a light pattern L2 in a field of view of the occupant. FIG. 10 is a schematic diagram showing distances from the visual point E of the occupant of the vehicle to a position in which the frame pattern M3 is formed (a display position of a virtual image forming the frame pattern M3) and to a position in which the light pattern L2 is formed (a display position).

As shown in FIG. 8, the display controller 43 determines whether a road-surface projection instruction signal is received from the vehicle controller 3 (step S11). The vehicle controller 3 transmits, to the display controller 43, the road-surface projection instruction signal to instruct the road-surface projector 45 to display a predetermined light pattern based on the traveling state information and/or the surrounding information of the vehicle 1.

If the road-surface projection instruction signal is received (YES in step S11), the display controller 43 determines whether the HUD information is being displayed by the HUD 42 (step S12). On the other hand, if the road-surface projection instruction signal is not received (NO in step S11), the processing ends.

If the HUD information is not being displayed (NO in step S12), the display controller 43 controls the road-surface projector 45 to display the light pattern based on the received road-surface projection instruction signal (step S13). For example, the display controller 43 controls the road-surface projector 45 such that the predetermined light pattern is projected onto the road surface at a predetermined distance from the visual point E of the occupant in the front-rear direction of the vehicle 1 based on the traveling state information and/or the surrounding information of the vehicle 1.

On the other hand, if the HUD information is being displayed (YES in step S12), the display controller 43 controls the road-surface projector 45 to display the predetermined light pattern based on the received road-surface projection instruction signal and position information of a virtual image of the HUD information (step S14). The display controller 43 controls the road-surface projector 45 such that a distance from the visual point E of the occupant to a position in which the light pattern is projected onto the road surface matches a distance from the visual point E of the occupant to a display position of the virtual image of the HUD information in the front-rear direction of the vehicle 1. For example, as illustrated in FIGS. 9 and 10, if the frame pattern M3 is a three-dimensional picture, the light pattern L2 is formed at a position where a range ($R_{L2}$) of a distance at which the light pattern L2 is displayed at least in part overlaps with a range ($R_{M3}$) of a distance at which a virtual image forming the frame pattern M3 is displayed in the front-rear direction of the vehicle 1 by driving and controlling the optical system of the road-surface projector 45. The light pattern L2 is formed such that $D_{L2} \leq D_{M3} + R_{M3}$ and $D_{M3} \leq D_{L2} + R_{L2}$ are satisfied, where a distance from the visual point E of the occupant to a rear end of the virtual image forming the frame pattern M3 is $D_{M3}$ and a distance from the visual point E of the occupant to a rear end of the light pattern L2 is $D_{L2}$.

According to the second embodiment described above, the display controller 43 is configured to control the road-surface projector 45 such that the distance from the occupant to the light pattern matches that from the occupant to the virtual image of the HUD information. Thus, the display position of the virtual image of the HUD information can be set regardless of a position in which the light pattern is projected onto the road surface. For example, if the HUD information is an image (for example, an arrow or a frame pattern) informing the occupant about presence of a target object (for example, the pedestrian), a virtual image can be displayed at a position that substantially coincides with a position of the target object (the pedestrian or the like). Thus, a predetermined image (virtual image) can be displayed independently on the position of the visual point of the occupant. Even if the occupant is seeing the HUD information and the light pattern is displayed, the occupant can quickly grasp information of the light pattern displayed later without changing the focal distance.

Although the embodiments of the present disclosure have been described above, it goes without saying that the technical scope of the present invention should not be construed as being limited by the description of the present embodiments. The present embodiments are merely examples, and a person skilled in the art would understand that various modifications can be made to the embodiments within the scope of the invention described in the claims. The technical scope of the present invention should be determined based on the scope of the invention described in the claims and equivalents thereof.

the range of the distance at which the virtual picture of the HUD information is displayed overlaps that at which the light pattern is displayed at least in part in the front-rear direction of the vehicle in the above-described embodiments, the present invention is not limited thereto. Essentially, as long as the occupant can see the HUD information and the light pattern without changing the focal distance, the display distance range of the virtual picture may not even overlap with that of the light pattern in the front-rear direction of the vehicle. For example, if the virtual image of the HUD information and the light pattern are displayed nearly at a predetermined distance from the occupant in the front-rear direction of the vehicle and the display distance range of the virtual image does not overlap with that of the light pattern but they are deviated by about 10% from the predetermined distance, the case meets "a distance matches."

One of the HUD information and the light pattern is being displayed and the other of the HUD information and the light pattern is displayed in the above-described embodiments, the present invention is not limited thereto. For example, in a case where the HUD display instruction signal and the road-surface projection signal from the vehicle controller 3 are received together to display both the HUD information and the light pattern, the display controller 43 may adjust a display position of the other of the virtual image of the HUD information and the light pattern in accordance with a display position of the one of the virtual image of the HUD information and the light pattern. In this case, effects similar to those of the above-described embodiments can be achieved.

Although the concave mirror 425 is configured to reflect the light emitted from the picture generation unit 423 toward the windshield 18 in the above-described embodiments, the present invention is not limited thereto. The concave mirror 425 may reflect the light toward a combiner provided inside the windshield 18. Although the concave mirror 425 is used as a reflector, the reflector may be configured with another member.

Although the HUD 42 includes the lens 424 as an optical system member configured to change the optical path length of the light emitted from the picture generation unit 423 in the above-described embodiments, the present invention is not limited thereto. The HUD 42 may change the optical path length using, for example, an optical system member configured with a plurality of lenses and a plane mirror or other members.

The present application is based on Japanese Patent Application No. 2019-179483, filed on Sep. 30, 2019, the contents of which are incorporated herein by reference.

The invention claimed is:

1. A vehicle display system for a vehicle, the vehicle display system comprising:
   a first display device configured to project a light pattern onto a road surface outside the vehicle;
   a second display device inside the vehicle configured to display a virtual image of a predetermined image to an occupant of the vehicle such that the virtual image of the predetermined image is superimposed on a real space outside the vehicle; and
   a controller configured to control the first display device and the second display device, wherein,
   in a case where both the virtual image of the predetermined image and the light pattern are displayed and can be grasped together by the occupant without changing a focal distance and a display period of the predetermined image overlaps at least in part with a display period of the light pattern at a certain time point, the controller causes a distance from the occupant to the virtual image of the predetermined image to at least in part overlap a distance from the occupant to the light pattern and a range of the virtual image of the predetermined image in the front-rear direction of the vehicle to at least in part overlap with a range of the light pattern on the road surface in the front-rear direction of the vehicle.

2. The vehicle display system according to claim 1, wherein
   the controller is configured to control the second display device such that the distance from the occupant to the predetermined image matches the distance from the occupant to the light pattern.

3. The vehicle display system according to claim 1, wherein
   the controller is configured to control the first display device such that the distance from the occupant to the light pattern matches the distance from the occupant to the predetermined image.

4. The vehicle display system according to claim 1, wherein,
   in a case where one of the predetermined image and the light pattern is being displayed and the other of the predetermined image and the light pattern is displayed, the controller causes a distance from the occupant to the other of the predetermined image and the light pattern to match a distance from the occupant to the one of the predetermined image and the light pattern.

5. A vehicle comprising:
   a vehicle display system, the vehicle display system comprising:
   a first display device configured to project a light pattern onto a road surface outside the vehicle;
   a second display device inside the vehicle configured to display a virtual image of a predetermined image to an occupant of the vehicle such that the virtual image of the predetermined image is superimposed on a real space outside the vehicle; and
   a controller configured to control the first display device and the second display device, wherein,
   in a case where both the virtual image of the predetermined image and the light pattern are displayed and can be grasped together by the occupant without changing a focal distance and a display period of the predetermined image overlaps at least in part with a display period of the light pattern at a certain time point, the controller causes a distance from the occupant to the virtual image of the predetermined image to at least in part overlap a distance from the occupant to the light pattern and a range of the virtual image of the predetermined image in the front-rear direction of the vehicle to at least in part overlap with a range of the light pattern on the road surface in the front-rear direction of the vehicle.

6. The vehicle according to claim 5, wherein
   the controller is configured to control the second display device such that the distance from the occupant to the predetermined image matches the distance from the occupant to the light pattern.

7. The vehicle according to claim 5, wherein
   the controller is configured to control the first display device such that the distance from the occupant to the light pattern matches the distance from the occupant to the predetermined image.

8. The vehicle according to claim 5, wherein,
in a case where one of the predetermined image and the light pattern is being displayed and the other of the predetermined image and the light pattern is displayed, the controller causes a distance from the occupant to the other of the predetermined image and the light pattern to match a distance from the occupant to the one of the predetermined image and the light pattern.

9. A vehicle display system for a vehicle, the vehicle display system comprising:
a first display device configured to project a light pattern onto a road surface outside the vehicle;
a second display device inside the vehicle configured to display a virtual image of a predetermined image to an occupant of the vehicle such that the virtual image of the predetermined image is superimposed on a real space outside the vehicle; and
a controller configured to control the first display device and the second display device, wherein,
in a case where both the virtual image of the predetermined image and the light pattern are displayed and can be grasped together by the occupant without changing a focal distance and a display period of the predetermined image overlaps at least in part with a display period of the light pattern at a certain time point, the controller causes a range of a distance at which the predetermined image is displayed to overlap with a range of a distance at which the light pattern is displayed at least in part in the front-rear direction of the vehicle.

* * * * *